Patented Apr. 3, 1934

1,953,169

UNITED STATES PATENT OFFICE 1,953,169

POLYMERIZATION OF DIENE HYDROCARBONS

Willis A. Gibbons, Montclair, N. J., and Eugene M. McColm, Boenet, Asahan, Sumatra, Dutch East Indies, assignors to The Naugatuck Chemical Company, Naugatuck, Conn., a corporation of Connecticut No Drawing. Application August 26, 1931, Serial No. 559,489

13 Claims. (Cl. 260—6)

This invention relates to the polymerization to rubber-like materials of diene hydrocarbons such as the butadienes, by means of a certain catalyst material.

Heretofore butadiene compounds have been polymerized to so-called synthetic rubbers by the use of various catalytic agents such as heat, oxygen, sodium, etc. It has now been found that the growing parts of the rubber tree (*Hevea brasiliensis*) particularly young shoots and the bark of older trees, contain a material adapted to catalyze the polymerization of diene hydrocarbons, which material is of unknown chemical character but which may be separated from the bark etc. by leaching or extracting the tree portions, preferably when in comminuted form, with water. It has been found that most of the catalyst material is removed from the bark etc., by one extraction at room temperature, whereas a fair proportion remains in the bark, etc., after one extraction at about 10° C.

A more specific manner of separating the catalyst material is given as follows:

*Example 1.*—About 10 liters of water is added to about 6 kgs. of ground bark. The bark is ground while in wet condition and the added water allowed to cover the bark. After about 24 hours standing at room temperature, the water solution is filtered off, the residual ground material being pressed free of excess liquid and the excess liquid added to the main filtrate. Lead acetate is then added to the water solution in slight excess. The precipitated lead salts thus obtained have been found to contain substantially all of the catalyst material. The precipitated lead compounds are recovered by filtration, decantation, centrifuging, or otherwise. During this step precautions must be observed to avoid loss of the active material, for repeated washing results in removal of most or all of the active catalyst material from the precipitated solids. It is therefore desirable to treat the recovered solids with as little water as possible. To recover a product free of lead, the precipitated lead compounds are then treated in the form of an aqueous paste or suspension with hydrogen sulphide until a filtered sample contains excess hydrogen sulphide, thereby effecting a double decomposition of the lead compounds. The aqueous mixture is then centrifuged to remove the lead sulphide that has formed, and the aqueous solution, containing the catalyst material, is freed of excess hydrogen sulphide in vacuo. Finally the aqueous solution, which is acidic in reaction, is evaporated to dryness in vacuo over a drying agent.

A crystalline mass is obtained which is very hygroscopic, and which was found to consist mainly of citric acid, the true active ingredient being present in a very small proportion. Pure citric acid, and sodium citrate, were found to be entirely inactive as polymerizing agents, although the possibility that they are promoters for the action of the true agent is not precluded. The crystalline mass may then be dissolved in water, titrated to neutrality with an alkali such as potassium or sodium hydroxide, and used in this form in preparing the emulsions to be polymerized. If desired, the crystalline mass may be treated with a solvent such as ethyl acetate to extract citric acid and the residual brown powder used as the polymerizing agent.

The catalyst material does not behave like a thermolabile enzyme since it was not inactivated, as shown by tests, by boiling the solution for about five minutes.

The best manner of using the catalyst material is in conjunction with a butadiene emulsion which contains salts of a kind existing in natural latex and in a concentration which proximates the salt concentration in natural latex; in addition the emulsion may contain an emulsifying agent such as an alkali-metal soap of a higher fatty acid, for instance sodium or potassium oleate, or its equivalent.

The following examples are further given as illustrative of the invention but with no intention of limiting it thereto.

*Example 2.*—6.1 kg. of the dried crystalline catalyst material are dissolved in water, titrated to neutrality with potassium hydroxide and made up to 25 liters. 12.5 liters of this solution are mixed with 5.0 liters of 10% potassium oleate solution and 7.5 liters of a solution prepared in the following manner:

Salt solution:

*Solution A*

0.1 kg. magnesium oxide
0.1 kg. sulphuric acid (1 liter of 10% sol.)
10 liters water

*Solution B*

0.1 kg. calcium oxide (CaO)
1.24 kg. phosphoric acid ($H_3PO_4$)
100 liters water Solutions A and B are mixed and made up to 300 liters. No precipitation occurs on mixing.

The resulting mixture, comprising the neutral solution of the catalyst material, the potassium oleate solution, and the salt solution, is brought to a pH of about 11–13, more particularly pH 12, with potassium hydroxide. 1.42 kg. of 2,3-dimethyl butadiene are then added, with or without slight stirring.

The resulting mixture is then shaken for about 90 hours, during which period polymerization of the hydrocarbon occurs. The emulsion of polymerized hydrocarbon may be used as such, or coagulated with acid as is usual with latex. After coagulation, a coagulum is obtained which may be sheeted and dried in the same manner as crude rubber and whose weight is about 40% of the dimethyl butadiene used.

*Example 3.*—A higher yield (90-95%) of synthetic rubber is obtained if the procedure shown in Example 2 is carried out upon a three-months-old dimethyl butadiene, which during that time has stood in an atomsphere of carbon dioxide.

Instead of using dimethyl butadiene, monomethyl butadiene may be used. The invention, however, is not restricted to these two butadienes, but may be employed with other polymerizable butadienes as will be understood by those skilled in the art. Furthermore, if desired, protein materials may be added to the emulsion to be polymerized, to give a more stable emulsion. An example of this is shown by Dinsmore U. S. P. No. 1,732,795.

With the detailed description given above, it will be obvious that modifications will suggest themselves without departing from the principle of the invention, and it is not desired to limit the invention otherwise than as set forth in the appended claims.

Having thus described our invention, what we claim and desire to protect by Letters Patent is:

1. A process of producing synthetic rubber which comprises polymerizing an emulsion of a diene hydrocarbon in the presence of a non-rubber catalyst material derived from the cortical portions of the rubber tree or shoot.

2. A process of producing synthetic rubber which comprises polymerizing an emulsion of a diene hydrocarbon in the presence of a non-rubber catalyst material obtainable by leaching with water the cortical portions of the rubber tree or shoot.

3. A process of producing synthetic rubber which comprises polymerizing an emulsion of a diene hydrocarbon in the presence of a non-rubber catalyst material obtained from an aqueous extract of the cortical portions of the rubber tree or shoot.

4. A process of producing synthetic rubber which comprises polymerizing an emulsion of a butadiene hydrocarbon in the presence of a non-rubber catalyst material derived from the cortical portions of the rubber tree or shoot which catalyst material has the property of forming with water-soluble lead salts, compounds sparingly soluble in water.

5. A process of producing synthetic rubber which comprises polymerizing an emulsion of a butadiene hydrocarbon in the presence of a catalyst material resulting from extracting the bark portions of the rubber tree known as *Hevea brasiliensis* with water, treating the extract with a soluble lead salt to precipitate water-insoluble lead compounds, treating an aqueous suspension of said compounds with hydrogen sulfide to effect a double decomposition thereof, recovering the aqueous solution free of lead sulfide and hydrogen sulfide, and removing the water from the solution to obtain a solid crystalline mass having acid properties.

6. A process of producing synthetic rubber which comprises polymerizing an aqueous emulsion of a butadiene hydrocarbon containing water soluble inorganic salts of a kind existing in natural latex and in a concentration which proximates the salt concentration in natural latex, in the presence of a non-rubber catalyst material obtained from the aqueous extract of the cortical portions of the rubber tree known as *Hevea brasiliensis* which catalyst material has the property of forming lead compounds sparingly soluble in water.

7. A process of producing synthetic rubber which comprises polymerizing an aqueous emulsion of a butadiene hydrocarbon containing water soluble calcium and magnesium salts of a kind existing in natural latex and in a concentration which proximates the salt concentration in natural latex, in the presence of a non-rubber catalyst material obtained from the aqueous extract of the cortical portions of the rubber tree known as *Hevea brasiliensis* which catalyst material has the property of forming lead compounds sparingly soluble in water.

8. A process of producing synthetic rubber which comprises polymerizing an emulsion of a methyl butadiene hydrocarbon in the presence of a non-rubber catalyst material obtainable by leaching with water the cortical portions of the rubber tree or shoot which catalyst material has the property of forming lead compounds sparingly soluble in water.

9. A process of producing synthetic rubber which comprises polymerizing an emulsion of a monomethyl butadiene hydrocarbon in the presence of a non-rubber catalyst material obtainable by leaching with water the cortical portions of the rubber tree or shoot which catalyst material has the property of forming lead compounds sparingly soluble in water.

10. A process of producing synthetic rubber which comprises polymerizing an emulsion of a dimethyl butadiene hydrocarbon in the presence of a non-rubber catalyst material obtainable by leaching with water the cortical portions of the rubber tree or shoot which catalyst material has the property of forming lead compounds sparingly soluble in water.

11. A process of producing synthetic rubber which comprises polymerizing an aqueous emulsion of a methyl butadiene hydrocarbon containing water soluble inorganic salts of a kind existing in natural latex and in a concentration which proximates the salt concentration in natural latex, in the presence of a non-rubber catalyst material obtained from the aqueous extract of the cortical portions of the rubber tree known as *Hevea brasiliensis* which catalyst material has the property of forming lead compounds sparingly soluble in water.

12. A process of producing synthetic rubber which comprises polymerizing an aqueous emulsion of a monomethyl butadiene hydrocarbon containing water soluble inorganic salts of a kind existing in natural latex and in a concentration which proximates the salt concentration in natural latex, in the presence of a non-rubber catalyst material obtained from the aqueous extract of the cortical portions of the rubber tree known as *Hevea brasiliensis* which catalyst material has the property of forming lead compounds sparingly soluble in water.

13. A process of producing synthetic rubber which comprises polymerizing an aqueous emulsion of a dimethyl butadiene hydrocarbon containing water soluble inorganic salts of a kind existing in natural latex and in a concentration which proximates the salt concentration in natural latex, in the presence of a non-rubber catalyst material obtained from the aqueous extract of the cortical portions of the rubber tree known as *Hevea brasiliensis* which catalyst material has the property of forming lead compounds sparingly soluble in water.

WILLIS A. GIBBONS.
EUGENE M. McCOLM.